United States Patent [19]
Kawamura

[11] 4,093,045
[45] June 6, 1978

[54] NOISE PREVENTING MEANS FOR DISC BRAKES

[75] Inventor: Kouji Kawamura, Susono, Japan

[73] Assignee: Toyota Jidosha Kogyo Kabushiki Kaisha, Japan

[21] Appl. No.: 756,978

[22] Filed: Jan. 5, 1977

[30] Foreign Application Priority Data

May 19, 1976 Japan .................. 51-63806[U]

[51] Int. Cl.² .................................. F16D 65/02
[52] U.S. Cl. ........................................ 188/73.5
[58] Field of Search ............. 188/1 B, 73.5, 250 B

[56] References Cited

U.S. PATENT DOCUMENTS

| | | | |
|---|---|---|---|
| 3,460,652 | 8/1969 | Botterill | 188/73.5 |
| 3,490,563 | 1/1970 | Hahm | 188/73.5 |
| 3,506,098 | 4/1970 | Anders | 188/73.5 X |
| 3,684,061 | 8/1972 | Ogawa et al. | 188/73.5 |
| 3,918,555 | 11/1975 | Rath | 188/73.5 |

FOREIGN PATENT DOCUMENTS 2,038,824  2/1972  Germany ............. 188/73.5

Primary Examiner—Duane A. Reger
Attorney, Agent, or Firm—Browdy and Neimark

[57] ABSTRACT

A noise or squeal preventing shim or plate member used in disc brakes of the kind wherein a friction pad is urged into engagement with a rotatable disc by a piston working in an hydraulic cylinder of which the axis is substantially at right angles to the plane of the disc. The shim or plate member is inserted between the piston and the friction pad, which plate member is (1) partially cut out a portion thereof at a location wherein the same confronts with the inner end or the thrust giving end of the piston on the side the rotating disc first comes around or enters, and (2) coated with a friction reducing material at least on the side confronting with the friction pad.

8 Claims, 6 Drawing Figures

(a) A DISC BRAKE WITHOUT THE SHIMS
(b) A DISC BRAKE WITH FLAT SHIMS, WITH NO CUT-OUT BUT COATED WITH PTFE
(c) A DISC BRAKE WITH CUT-OUT SHIMS, NO COATING
(d) A DISC BRAKE WITH THE TRIAL SHIMS

← NOISE OCCURRING RATE, %

NOISE PREVENTING MEANS FOR DISC BRAKES

BACKGROUND OF THE INVENTION

This invention relates to a noise preventing or reducing means used in disc brakes, more particularly to an improvement of a noise reducing means of the type wherein a plate member is inserted between the friction pad and the piston which urges the same.

In disc brakes of the type in which a friction pad is urged, with a piston working in an hydraulic cylinder, onto a disc rotating together with the wheels or others in order to halt the disc, unpleasant or disagreeable noises sometimes occur, among which the noise named "squeal of the brake" is most unpleasant, and various attempts have been made for the prevention thereof.

As one of those attempts, U.S. Pat. No. 3,113,643 is widely known for its effectiveness in reducing the noise. The essence of this prior art invention lies in the insertion of a shim or a plate member between the friction pad and the piston, which plate member being partially cut out an elongatedly extending arcuate aperture at a location wherein the same confronts with the inner end of the piston on the side the rotating disc first comes into alignment therewith.

Concerning the reasoning for the good effects of the insertion of such a plate member (hereinafter simply referred to as cut-out shim), the above cited U.S. Pat. No. 3,113,643 discloses as follows:

(1) Experiments indicate that one of the causes of squeal which is liable to occur when the friction pad is applied to the disc is the rigidity of the engagement between the piston and the backing plate of the pad. According to my invention, in a brake or clutch of the kind set forth, the piston is arranged to engage the backing plate of the friction pad over an area which is not symmetrical with respect to the axis of the hydraulic cylinder.

(2) Tests have shown that it is preferable to cut out the shim or step or set back the piston or backing plate on the side of the axis of the cylinder or the center of the friction pad with which any given point on the disc first comes into alignment, so that the center of the area of contact between the piston and the backing lies on the other side of the axis of the cylinder or the center of the pad. This assists in ensuring substantially even wear of the pad over the whole of its area.

SUMMARY OF THE INVENTION

The above cited U.S. Pat. No. 3,113,643 is indeed an effective invention in reducing the noise or squeal accompanied by the disc brakes of the kind set forth. The present invention is, however, aimed at a further improvement of the noise preventing effect in question. It is therefore a primary object of this invention to provide a cut-out shim which is remarkably improved in the effect of noise prevention, in case of brake applying, by coating it with polytetrafluoroethylene (PTFE), a friction reducing material, at least on the side abutting the rear side of the friction pad, to be more exact, on the rear side of the backing plate supporting the friction member.

It is another object of this invention to provide a cut-out shim with the above mentioned purpose by coating it with other friction reducing materials than PTFE, which have a small coefficient of friction and heat-resistant characteristics.

It is still another object of this invention to provide a cut-out shim for the same aim which is coated not only on the abutting side with the friction pad but also on the side facing the inner end of the piston, and to provide a plurality of cut-out shims coated with a friction reducing material and inserted one over the other between the piston and the friction pad.

DETAILED DESCRIPTION OF THE PREFERRED EMBODIMENTS

Figure 1:
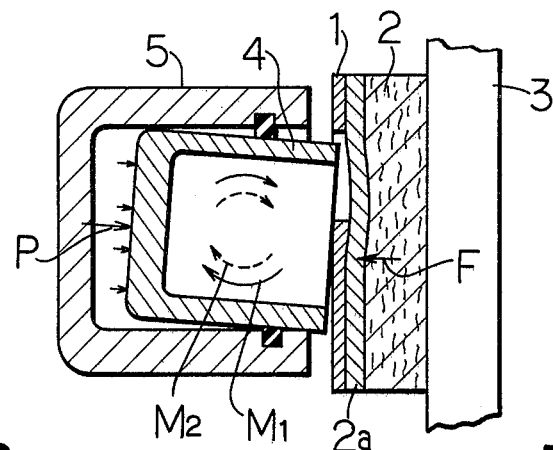
FIG. 1 is a schematic view in vertical section of a portion of a disc brake with a cut-out shim for explaining the function thereof.

Before entering the description a short statement of the process having come to this invention will be made for the purpose of better understanding. The inventor of this invention assumed the noise preventing effect of the cut-out shim is attributable to that the shim is helpful in reducing the vibration of the piston 4 within the cylinder 5. That is to say, when urging the friction pad 2, as can be seen in FIG. 1, against the disc 3 via the cut-out shim 1, the piston 4 is subjected to a couple of force $M_1$, composed of an hydraulic pressure force P i.e. summation of pressure acting evenly over the whole area of the outer end of the piston 4 and the reaction force F coming from the friction pad 2 in response to the force exerted thereon via the cut-out shim, at an offset position with respect to the axis of the piston 4, with the result the piston 4 being forcibly kept in a slanted position in the cylinder 5 as shown in FIG. 1. This state of being prevented from a free vibration due to the couple of force $M_1$ is thought to come in effect to contribute to the reduction of the disagreeable noise, in other words the merit of inserting the cut-out shim.

Thinking in this way makes it quite understandable that a couple of force $M_2$ produced in the piston 4 by a force hinted by an arrow H in FIG. 1, i.e., the downward force exerted on the inner end of the piston 4, via the friction pad 2 and the cut-out shim 1, by virtue of the downwardly rotating disc 3, shall be similar in the direction to the abovementioned couple of force $M_1$ due to the cut-out shim 1, in order to be effective in the noise prevention.

The above assumption leads to a conclusion that the cut-out shim 1 will be almost perfectly effective as a noise preventive means provided that the coefficient or friction between the piston 4 and the cut-out shim 1 and/or between the cut-out shim 1 and the friction pad 2 (more exactly the backing plate 2a of the friction pad 2) be reduced as much as possible. Because the friction pad 2, which is urged against the rotating disc 3, may sometimes be inclined in reverse to the rotation direction of the disc 3 due to an instantaneous change of the frictional force between the same and the disc 3, while it is normally biased in the rotation direction of the disc 3. This inclination may cause the piston 4 to list in the reverse direction to the couple of force $M_1$ and $M_2$, which is deemed to become a cause of the noise or squeal.

Figures 2, 4:
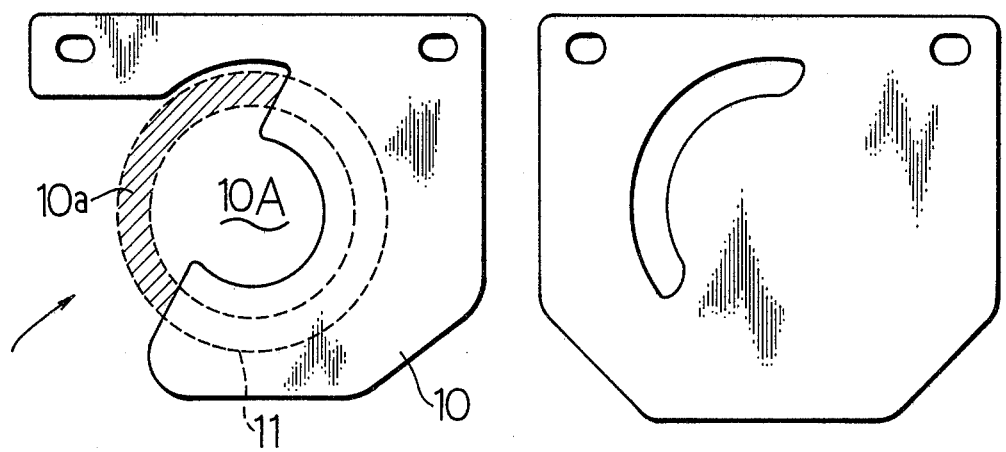
FIG. 2 is an elevational view of a cut-out shim in accordance with an embodiment of this invention.
FIG. 4 is an elevational view of a cut-out shim in another embodiment of this invention.

On the basis of this theory the inventor made a stainless steel cut-out shim 10 shown in FIG. 2, by way of experiment, with the thickness of 0.4mm, which is coated, over the whole area contacting with the friction pad, with PTFE having the thickness of 0.04mm. The cut-out shim 10 is, as can be seen in the FIG. 2, cut away a portion thereof denoted by 10A, which cut away portion includes the hatched portion 10a, a portion of the annular thrust receiving plane 11 from the piston 4 shown with the two broken lines, located slightly upside at the entering side of the disc 3 in which the rotating disc 3 first comes into alignment therewith (arrow mark indicates the rotation direction of the disc 3). The reason why PTFE is selected as a coating material is because of its small value in the coefficient of friction and excellent characteristic of heat resistance.

Figure 3:
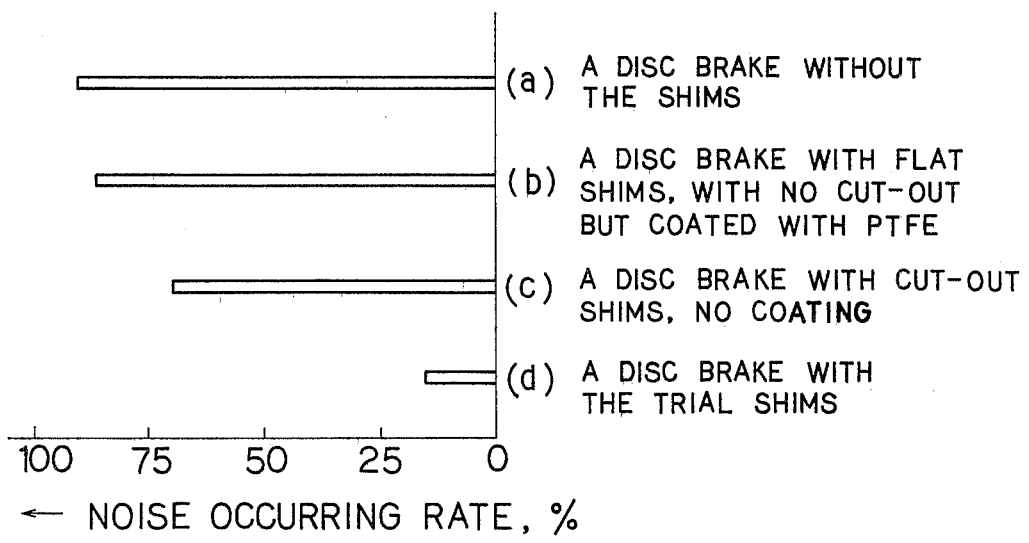
FIG. 3 is a graph showing the results of experiments measuring the noise preventing effect of the cut-out shim shown in FIG. 2.

An experiment was executed, on attaching some trially manufactured cut-out shims 10 (hereinafter referred to as "trial shim") to normally used disc brakes, for measuring the noise preventing effect. The experimental data on the noise occurring rate is shown on the graph of FIG. 3; for the purpose of better or clearer comparison the measurement was carried out on four kinds of samples, that is, (a) a disc brake without the shims wherein the friction pad is directly urged by the piston; (b) a disc brake with flat shims, having no cut-out portion, coated with PTFE under the same condition as in the trial shim; (c) a disc brake with cut-out shims, having no coating, which is similar in shape to the trial shim but not coated with PTFE; and (d) a disc brake with the trial shims. The noise preventing effect on the trial shim 10 is conspicuously high in comparison to other three kinds of samples. In other words, the noise occurring rate of the trial shim is remarkably low comparing to the coated flat shim or non-coated cut-out shim. Applying coating on the conventional cut-out shim at least on the side confronting with the friction pad with PTFE experimentally proves to be quite effective in the noise prevention.

Some other embodiments will be described hereunder. The configuration of the cut-out shim is not limited to that in FIG. 2; a cut-out shim, for example, with an opening like a crescent as illustrated in FIG. 4 is also usable. It can be said that any shim which is cut-out or cut-away at a portion, wherein the same confronts with the inner end or thrust giving end of the piston on that side of the axis of the cylinder with which any given point on the rotating disc first comes into alignment, is usable and similarly effective in the noise prevention to the abovementioned embodiment.

The coating material for the shim is not limited to PTFE, but any other materials small in coefficient of friction and heat-resistant may be practicable and similarly effective for the purpose.

Furthermore, applying coating with friction reducing materials on either sides of the shim, that is, on the side contacting the piston as well as the side contacting the friction pad, also proves a good effect.

Figure 5:
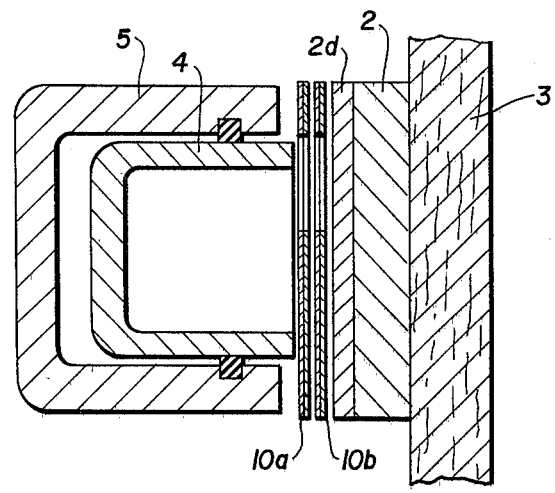
FIG. 5 is a schematic view in vertical section of a portion of a disc brake with a plurality of cut-out shim.

As still another embodiment, a use of a plurality of cut-out shims 10a and 10 b, as shown in FIG. 5 is also recommendable for the same purpose, the other parts shown in FIG. 5 corresponding to those of FIG. 1 with the same reference numerals.

It will be obvious to those skilled in the art that various changes may be made without departing from the scope of the invention and the invention is not to be considered limited to what is shown in the drawings and described in the specification.

Figure 6:
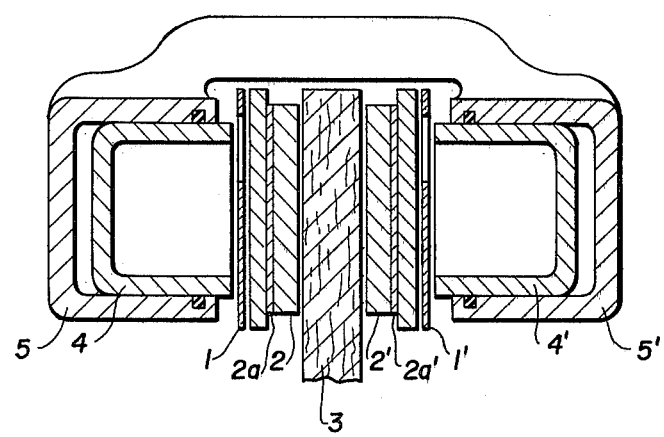
FIG. 6 is a schematic view in vertical section of a portion of a disc brake having a cut-out shim on each side of its disc.

As shown in FIG. 6 a disc braking apparatus can be composed of a disc 3 as in FIG. 1, one side of the disc 3 being associated with a friction pad 2, backing plate 2a, shim or plate member 1, piston 4 and cylinder 5 as shown in FIG. 1. The other side of the disc 3, as shown in FIG. 6 is operatively associated with a second friction pad 2', a second backing plate 2'a, a second shim or plate member 1', a second piston 4' and a second cylinder 5'.

What is claimed is:

1. A brake noise or squeal preventing means for use in disc brakes of a type in which a rotatable disc in rotation is decellerated or stopped by a friction pad being urged via a piston having a thrust giving end and working in a hydraulic cylinder having an axis, the preventing means comprising a shim or plate member unfixedly interposed between said piston and said friction pad, said shim or plate member having a cut out portion thereof at a location where the same confronts with said thrust giving end of said piston on that side of said axis of said cylinder with which any given point on said disc first comes into alignment; and a coating of friction reducing material on at least one side of said shim or plate member confronting with said friction pad, in order to slide easily against said friction pad.

2. A preventing means as set forth in claim 1, wherein said coating of friction reducing material applied is polytetrafluoroethylene.

3. A preventing means as set forth in claim 1, including a coating of friction reducing material on a side of said shim or plate member confronting with said thrust giving end of said piston.

4. A preventing means as set forth in claim 1, wherein said cut-out portion is a crescent-like opening.

5. A preventing means as set forth in claim 1, wherein a plurality of said shims or plate members are interposed in a laminated state between said piston and said friction pad.

6. A disc braking apparatus comprising: a rotatable disc having first and second major surfaces; a first friction pad disposed opposite said first major surface of said disc and a second friction pad disposed opposite said second major surface of said disc; a first piston having a thrust giving end and working in a first hydraulic cylinder having an axis and a second piston having a thrust giving end and working in a second hydraulic cylinder having an axis; a first shim or plate member unfixedly interposed between said first piston and said first friction pad, said first shim or plate member having a cut-out portion thereof at a location where the same confronts said thrust giving end of said first piston on that side of said axis of said first cylinder with which any given point on said first surface of said disc comes into alignment; a first coating of friction reducing material on at least one side of said first shim or plate member confronting said first friction pad, in order to slide easily against said first friction pad; a second shim or plate member unfixedly interposed between said second piston and said second friction pad, said second shim or plate member having a cut-out portion thereof at a location where the same confronts said thrust giving end of said second piston on that side of said axis of said second cylinder with which any given point on said second surface of said disc comes into alignment; a second coating of friction reducing material on at least one side of said second shim or plate member confronting said second friction pad, in order to slide easily against said second friction pad; whereby brake noise or squealing is substantially reduced.

7. A brake noise or squeal preventing means for use in disc brakes of a type in which a rotatable disc in rotation is decellerated or stopped by a friction pad being urged via a piston having a thrust giving end and working in a hydraulic cylinder having an axis, the preventing means comprising a shim or plate member made of stainless steel unfixedly interposed between said piston and said friction pad, said shim or plate member having a part of its annular portion confronting said thrust giving end of said piston cut out, at an upward location on that side of said axis of said cylinder with which any given point on said disc first comes into alignment; and a coating of polytetrafluoroethylene on that side of said shim or plate member confronting with said friction pad in order to slide easily against said friction pad.

8. A preventing means as set forth in claim 7, wherein said shim or plate member has the thickness of about 0.4 mm, and said coating of polytetrafluoroethylene is a layer of about 0.04 mm in thickness.

* * * * *